US005375622A

United States Patent [19]
Houston

[11] Patent Number: 5,375,622
[45] Date of Patent: Dec. 27, 1994

[54] MULTIPORT VALVE INCLUDING LEAKAGE CONTROL SYSTEM, PARTICULARLY FOR A THERMAL REGENERATIVE FUME INCINERATOR

[76] Inventor: Reagan Houston, 252 Foxhunt La., Hendersonville, N.C. 28739

[21] Appl. No.: 163,346

[22] Filed: Dec. 7, 1993

[51] Int. Cl.$^5$ .............................. F16K 11/052
[52] U.S. Cl. ................... 137/240; 137/246; 137/625.47
[58] Field of Search .............. 137/240, 246, 625.47

[56] References Cited

U.S. PATENT DOCUMENTS

| | | |
|---|---|---|
| 3,045,692 | 7/1962 | Reynolds et al. ............ 137/240 |
| 3,870,474 | 3/1975 | Houston . | |
| 4,543,996 | 10/1985 | Baron ...................... 137/625.47 X |
| 5,000,422 | 3/1991 | Houston . | |
| 5,217,041 | 6/1993 | Houston . | |

*Primary Examiner*—Arnold Rosenthal
*Attorney, Agent, or Firm*—Carter & Schnedler

[57] ABSTRACT

A multiport fluid flow control valve, particularly for use in a regenerative incinerator system for treating process emissions to remove volatile organic combustibles (VOCs). A valve housing has at least three main conduit connection openings. A butterfly valve element rotatable within the housing on a valve element axis has at least two radially-extending rectangular wings such that different pairs of the main conduit connection openings are in deliberate fluid communication depending on the position of the valve element. To accommodate thermal expansion, there is a gap between the peripheries of the valve element wings and an inner surface of the valve housing. Leakage across this gap is prevented by a valve element structure which cooperates with a portion of the valve housing inner surface to define a plenum. The plenum is either pressurized or forcibly vented. In one form, the structure which cooperates to define a plenum comprises a U-shaped channel element on the peripheries of the wings. In another form, the structure which cooperates to define a plenum includes a pair of spaced parallel plates fastened to a shaft extending along the valve element axis. For pressurizing or venting the plenum there is a minor conduit, which may take the form of either ports on the valve conduit or a hollow shaft extending along the valve element axis, as examples.

35 Claims, 3 Drawing Sheets

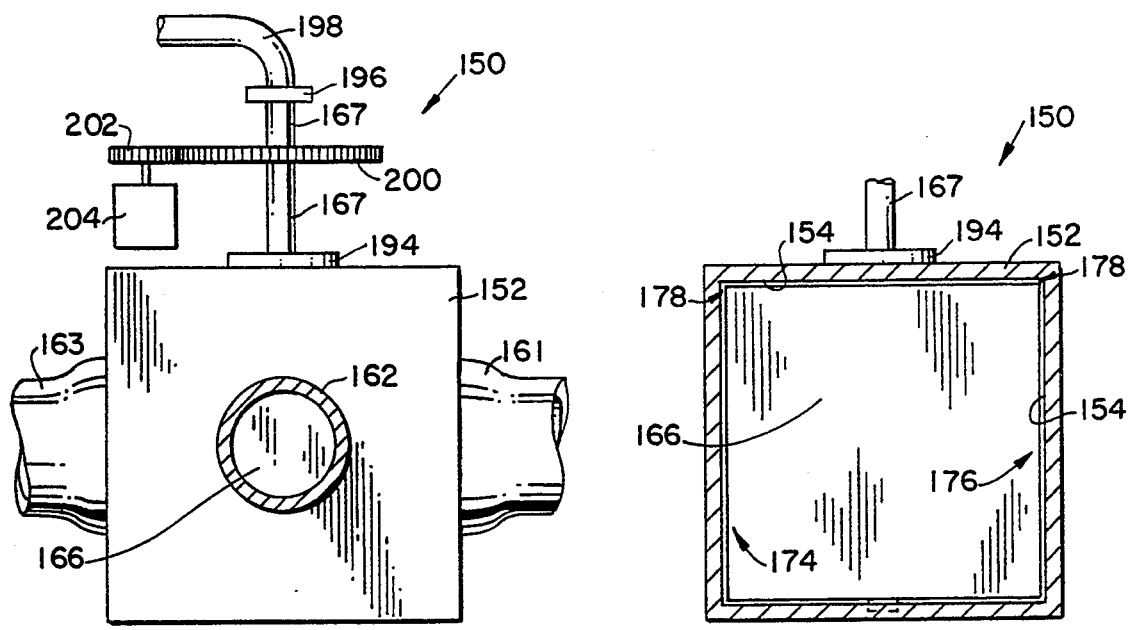
FIG. 6
FIG. 7
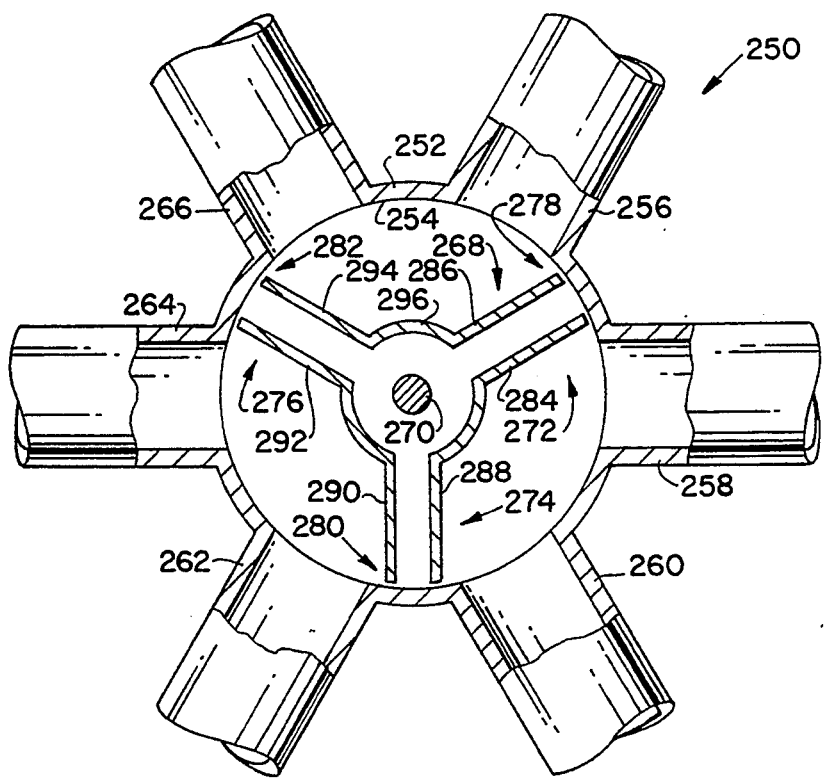
FIG. 8

MULTIPORT VALVE INCLUDING LEAKAGE CONTROL SYSTEM, PARTICULARLY FOR A THERMAL REGENERATIVE FUME INCINERATOR

BACKGROUND OF THE INVENTION

The present invention relates generally to incinerator systems for the abatement of process emissions and, more particularly, to a valve for the control of fluid flow to and from a regenerative incinerator.

Process emissions often contain combustible contaminants that, if released to the atmosphere, have the potential of polluting the environment. More particularly, noxious fumes, waste gas or process emissions generally contain contaminants in the form of volatile organic combustibles (VOCs).

However, the amount of combustible material contained in these emissions is generally below the concentration required to ignite or propagate a flame at ambient temperature. Accordingly, incinerators are employed to treat the process emissions by increasing the temperature of such process emissions to a temperature above the ignition temperature of the contaminants therein so as to oxidize the contaminants.

For increased efficiency, a regenerative incinerator may be employed, which has two or more regenerative beds, connected to a common combustion chamber. Each regenerative bed is filled with a solid packing, such as a multiplicity of heat retaining ceramic rings. In the case of a two-bed regenerative incinerator, gas flow is such that hot gas from the combustion chamber heats one incinerator bed while the other regenerative bed is used to preheat incoming process emissions. Gas flow through the regenerative beds is periodically alternated so that the one regenerative bed then preheats incoming process emissions, while the other regenerative bed is heated by hot gas from the combustion chambers. Regenerative preheating increases the overall efficiency of the incinerator by minimizing the amount of fuel required to raise the process emissions to ignition temperature.

It will be appreciated that a suitable valving arrangement is required to alternate the gas flow and thus the functions of the two (or more) regenerative beds. It will further be appreciated that demanding requirements are placed on flow control valves in a regenerative incinerator application. The valves must be relatively large to handle a high volume of gas flow, and further must operate over a typical incinerator temperature range of 50° F. to 1,000° F. (10° C. to 538° C.).

By way of more particular example, such regenerative incinerators are disclosed in Houston U.S. Pat. No. 3,870,474, entitled "Regenerative Incinerator Systems for Waste Gases"; Houston U.S. Pat. No. 5,000,422, entitled "Incinerator Valve"; and Houston U.S. patent application Ser. No. 08/067,665, filed May 26, 1993, entitled "Two Bed Thermal Regenerative Fume Incinerator", the entire disclosures of which are hereby expressly incorporated by reference.

The above-incorporated Houston U.S. Pat. No. 3,870,474 discloses a three-bed regenerator system employing three-way valves. The system is such that each bed, at different times, is a feed bed, a purge bed and an exhaust bed. The above-incorporated Houston U.S. Pat. No. 5,000,422 discloses a three-bed regenerative incinerator system employing simple butterfly valves which are either open or closed. The above-incorporated Houston application Ser. No. 08/067,665 discloses a two-bed regenerative incinerator which employs a four-way valve to reverse the flow through the two beds.

A problem which materially affects the effectiveness of such regenerative incinerators is leakage of untreated process emissions past the relatively large flow control valves required for control of fluid to and from the regenerative beds. For example, the two-bed regenerator disclosed in the above-incorporated application Ser. No. 08/067,665 has a single four-way valve to alternately control the flow to and from the two regenerative beds. The four-way valve has two interior spaces defined on either side of a two-position butterfly valve element. When the butterfly valve element is in either of its two positions there is untreated fluid in one interior space within the valve and treated fluid in the other interior space within the valve. Leakage of untreated fluid through the valve into the interior space with treated fluid seriously compromises the effectiveness of the incinerator system, and decreases purity of the incinerator exhaust emission.

Another problem is that, during the relatively short interval when the butterfly valve element is being operated and moving between the two valve positions, an inlet conduit containing untreated gas may be directly connected to an outlet conduit which should contain only treated gas. This can also seriously decrease the purity of the incinerator exhaust emission.

In the above-incorporated Houston U.S. Pat. No. 5,000,422, as well as in Houston U.S. Pat. No. 5,217,041, it is disclosed that a simple two-way on/off butterfly valve can be made leakproof by an annular plenum on the rim of the disk or flapper within the valve, and either pressurizing or purging the annular plenum. U.S. Pat. Nos. 5,000,422 and 5,217,041 disclose specific structures to define the plenum and to provide fluid communication with the plenum.

As another example, block and bleed valve arrangements have two main valves with a bleed valve in between. This has been used to eliminate the effect of valve leakage. However, with a multiport valve, such an arrangement is impractical.

Yet another example of a known valve arrangement which has better leakage characteristics is a ball valve with associated venting. However, for pipes over four inches in diameter, ball valves typically are not large enough to adequately function as incinerator control valves, or cannot be feasibly constructed of materials able to operate over a typical incinerator temperature range of 50° F. to 1,000° F. (10° C. to 538° C.), or both.

SUMMARY OF THE INVENTION

Accordingly, it is an object of the invention to provide a multiport flow control valve including a leakage control system to preclude leakage of fluid from one part of the valve to another part.

It is another object of the invention to provide a multiport flow control valve, particularly for use in regenerative incinerators, which includes structure to provide a pressure differential within the valve to preclude leakage of emissions from one part of the valve to another.

It is a related object of the invention to provide a multiport flow control valve which is pressurized or vented to preclude fluid leakage from one part of the valve to another.

It is yet another object of the invention to at all times prevent direct communication between the inlet conduit of a thermal regenerative fume incinerator and the outlet conduit, and particularly when a butterfly valve element is moving between its valve positions.

Briefly stated, and in accordance with the invention, a multiport fluid control valve includes a valve housing with an inner surface and at least three main conduit connection openings. In one embodiment, the valve housing is cylindrical, and has a cylindrical axis.

Within the valve housing is a butterfly valve element rotatable on a valve element axis between at least two valve positions. The valve element has at least two wings substantially identical in shape and extending radially from the valve element axis. In the case of a valve housing which is cylindrical, the valve element axis extends along the cylindrical axis, and the valve element wings are generally rectangular.

The configurations of the valve housing and of the valve element, as well as the orientation of the valve element axis, are such that the peripheries of the valve element wings are adjacent to the inner surface of the valve housing when the valve element is in either of the two valve positions. The main conduit connection openings are located on the valve housing at different angular orientations with reference to the valve element axis such that different pairs of the main conduit connection openings are in deliberate fluid communication when the valve element is in different valve positions. As one example, the main conduit connection openings lie in a plane perpendicular to the valve element axis.

Various specific arrangements are possible, for example, a three-way valve with three main conduit connection openings and a valve element having two wings; a four-way valve having four main conduit connection openings and a valve element also having two wings; and a six-way valve having six main conduit connection openings and a valve element having three wings.

To minimize leakage, the butterfly valve element includes structure which cooperates with a portion of the inner surface of the valve housing to define a plenum, at least when the valve element is in either of the valve positions. A minor conduit is provided in fluid communication with the plenum thus defined.

In one more particular embodiment in accordance with the invention, the structure which cooperates to define a plenum comprises a channel element, such as a U-shaped channel, on the peripheries of the wings. The channel element has open edges proximate the inner surface of the valve housing at least when the valve element is in either of the valve positions. Preferably, the U-shaped channel and the plenum thus defined are wide enough to completely cover the main conduit connection openings as the channel element moves past the main conduit connection openings while the valve element is moving between valve positions. In this embodiment, the minor conduit, for example, may comprise a small port or aperture in the valve body, which aperture is in alignment with the channel element, and thus in alignment with the plenum, when the valve element is in either of the valve positions.

In another more particular embodiment of the invention, the valve element structure which cooperates to define a plenum includes a pair of spaced parallel plates fastened to a shaft extending along the valve element axis. In this embodiment, the minor conduit may take the form of a small port or aperture in the valve body, as in the case of the one more particular embodiment summarized hereinabove, or may comprise a shaft in the form of a hollow tube.

The minor conduit and thus the valve plenum may either be pressurized by an external, non-contaminating fluid, or the valve plenum may be vented. In either event, as a result there is no leakage from any of the main conduits into any of the other main conduits which are not in deliberate fluid communication. In cases where the valve plenum is pressurized, pressurizing fluid may be treated fluid which flows through the valve. In cases where the valve plenum is vented, the vented fluid may be admixed with untreated fluid entering the valve through one of the main conduit connection openings.

BRIEF DESCRIPTION OF THE DRAWINGS

While the novel features of the invention are set forth with particularity in the appended claims, the invention, both as to organization and content, will be better understood and appreciated from the following detailed description, taken in conjunction with the accompanying drawings, in which:

FIG. 6 is a view taken on line 6—6 of FIG. 5;

FIG. 7 is a view taken on line 7—7 of FIG. 5; and

FIG. 8 is a view, comparable to FIGS. 2 and 5, of a six-way valve in accordance with the invention.

DETAILED DESCRIPTION

Figure 1:
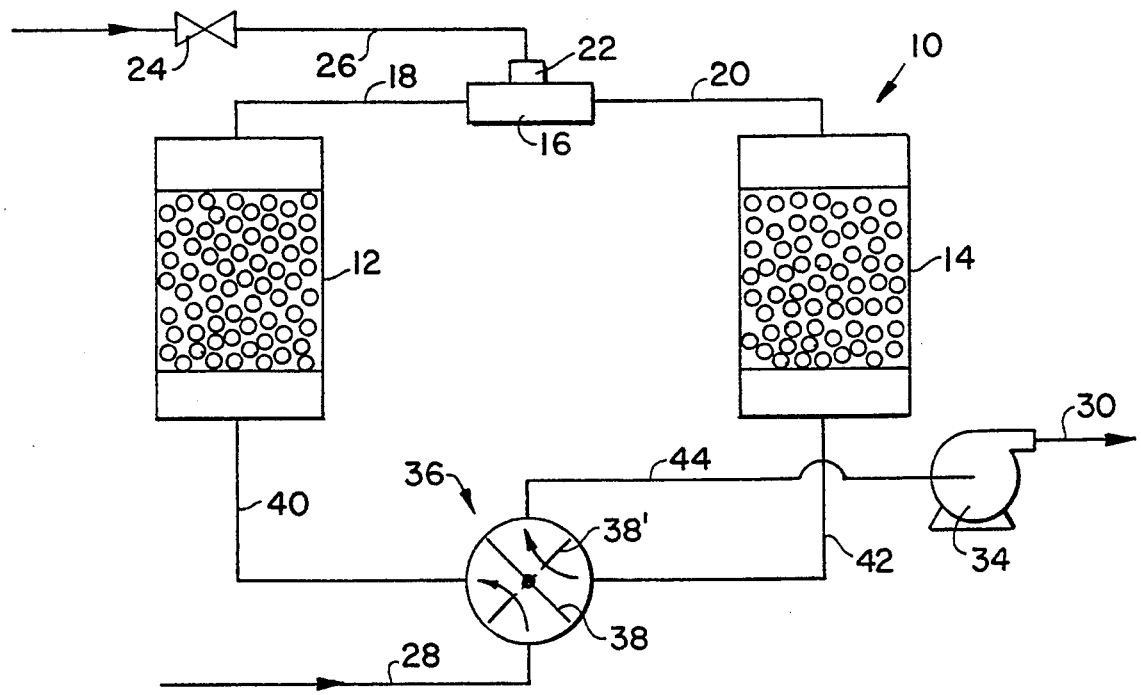
FIG. 1 illustrates an environment of the invention, and depicts, in highly schematic fashion, a two-bed regenerative incinerator system including a single four-way fluid control valve.

Referring first to FIG. 1, a regenerative incinerator system, generally designated 10, represents an environment wherein the present invention has particular utility, and is a simplified version of a regenerative incinerator disclosed in the above-incorporated application Ser. No. 08/067,665. The incinerator system 10 has a pair of conventional regenerative beds 12 and 14 connected to a common combustion chamber 16 via respective conduits 18 and 20. The combustion chamber 16 has a burner 22 and fuel, such as natural gas, is supplied through a control valve 24 and a conduit 26.

In overview, process emissions containing volatile organic combustibles (VOCs) are introduced, preferably at a pressure below atmospheric pressure, into the system 10 via an inlet conduit 28, and treated gas is conveyed away from the incinerator system 10 via an exhaust conduit 30 connected to the output of an exhaust blower 34. Pressurized fluid from the exhaust conduit 30 is vented to the atmosphere, and additionally may be employed to pressurize the valve of the invention, as is described hereinbelow in greater detail with reference to FIGS. 2–8.

A four-way fluid flow control valve 36 is provided for periodically reversing the gas flow through the two regenerative beds 12 and 14. The fluid control valve 36 includes a butterfly valve element 38 rotatable between two valve positions, respectively shown in FIG. 1 as a solid line position 38 and a phantom line position 38'. The two positions 38 and 38' are at a 90° angle with reference to each other. Although not illustrated in FIG. 1, it will be appreciated that there is an actuator element, controlled by a suitable timer device, for periodically rotating the butterfly valve element between its two positions 38 and 38'.

During operation, untreated gas containing oxygen and VOCs is admitted to the regenerative incinerator system 10 through the conduit 28 and initially enters the valve 36 on one side thereof. With the valve element 38 in the position shown in solid lines in FIG. 1, gas flows through a conduit 40 up through the regenerative bed 12 to be preheated, and enters the combustion chamber 16 through the conduit 18. The burner 22, in addition to fuel from the conduit 26, may have combustion air supplied to it. Combustion of the fuel and oxygen raises the gas temperature to 1,500° F. or higher to burn all VOCs to carbon dioxide and water. The heated combustion gas then passes through the conduit 20 and down through the regenerative bed 14 where the gas is cooled by the ceramic packing therein and the packing is heated. Cooled gas then passes through a conduit 42 to reenter the valve 36 on the other side thereof, and is then drawn out by the blower 34 through the exhaust conduit 44 to exit through the exhaust conduit 30.

When the valve element is in the alternative position 38', gas flow through the regenerative beds 12 and 14 is reversed. Thus, incoming untreated gas within the conduit 28 initially enters the valve 36 to exit on conduit 42 to be preheated in the other regenerative bed 14, and treated gas, after heating the one regenerative bed 12, re-enters the valve 36 along conduit 40, and then exits on the exhaust gas conduit 44.

In either event, it will be appreciated that leakage from one side of the valve 36 to the other can seriously degrade the performance of the system 10, by allowing untreated gas to pass directly from the inlet conduit 28 to the exhaust conduit 44.

Figure 2:
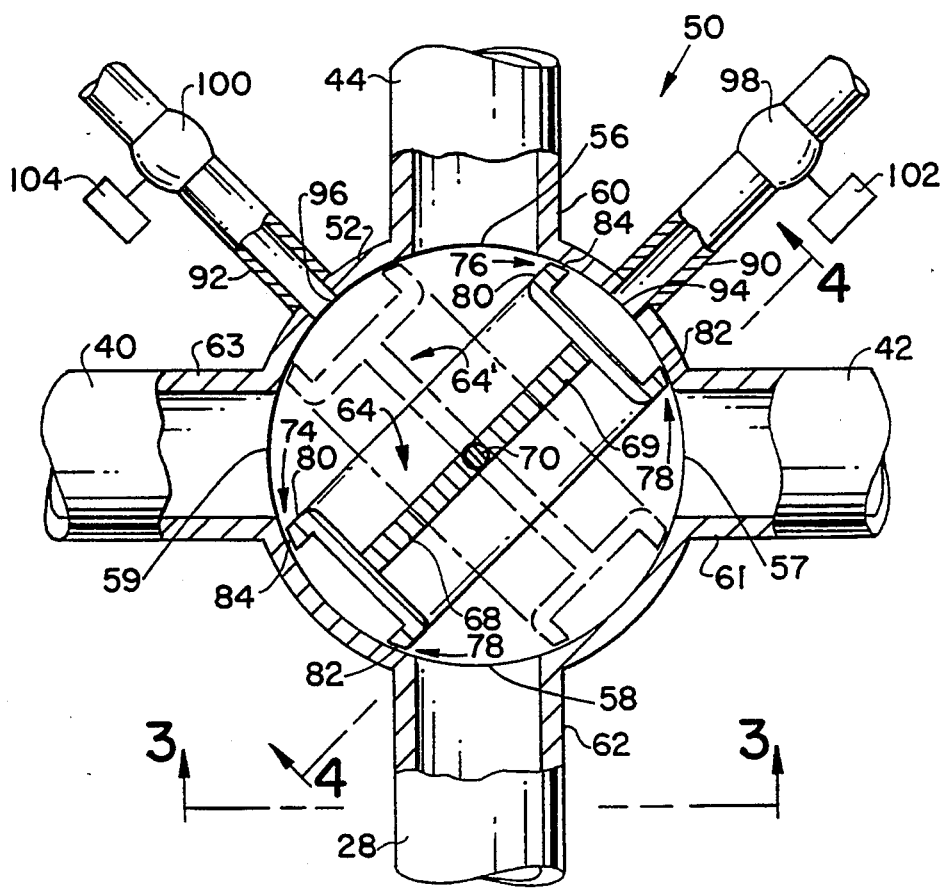
FIG. 2 depicts the interior of a four-way valve in accordance with one embodiment of the invention, FIG. 2 being partly sectioned and being a view along the axis of the butterfly valve element.
Figure 3:
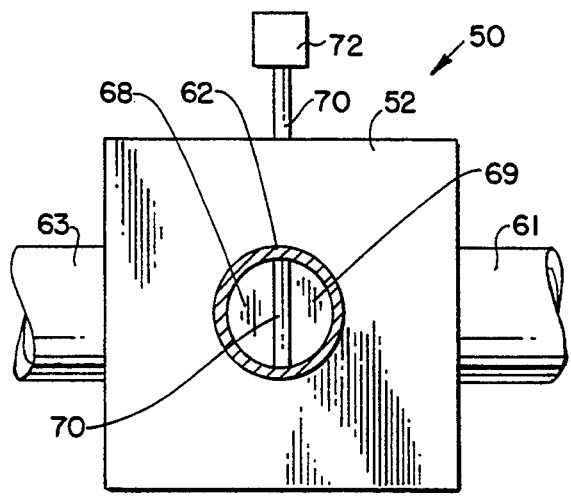
FIG. 3 is a view taken on line 3—3 of FIG. 2, showing the outside of the cylindrical valve housing.
Figure 4:
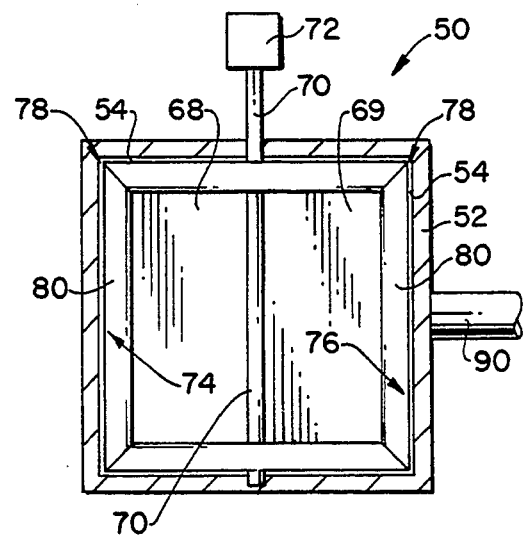
FIG. 4 is a view taken on line 4—4 of FIG. 2, depicting the butterfly valve element.

FIGS. 2-4 illustrate one embodiment 50 of a multi-port fluid control valve in accordance with the invention. The valve 50 includes a cylindrical valve housing 52 having an inner surface 54. The valve housing 52 has four main conduit connection openings 56, 57, 58 and 59 in fluid communication with the interiors of respective conduits 60, 61, 62 and 63. When the valve 50 is employed in a regenerative incinerator system such as the system 10 of FIG. 1, it will be appreciated that the conduits 60, 61, 62 and 63 of FIGS. 2-4 correspond respectively to the conduits 44, 42, 28 and 40 of FIG. 1, and alternative reference numbers are accordingly employed in FIG. 2.

Within the valve housing 52 is a butterfly valve element, generally designated 64, having two wings 68 and 69 which are substantially identical in shape and which extend radially from a rotatable shaft 70 which defines a valve element axis. An actuator 72 (FIGS. 3 and 4) is provided for rotating the valve element 64 between the position shown in solid lines in FIG. 2 and another valve position represented in FIG. 2 by phantom lines 64'.

The configurations of the valve housing 52 and the valve element 64, and the orientation of the valve element axis defined by the shaft 70, are such that peripheries 74 and 76 of the wings 68 and 69 are adjacent the inner surface 54 of the valve housing 52 when the valve element 64 is in either of the two valve positions, and the connection openings 56, 57, 58 and 59 in fluid communication with the main conduits 60, 61, 62 and 63 are such that different pairs of the main conduits are in deliberate fluid communication when the valve element 64 is in the two different valve positions.

To accommodate manufacturing tolerances, and to facilitate operation when there is unequal thermal expansion of the various valve components in view of the relatively high operating temperature of the valve 50, there is a gap 78 of approximately 0.02 inches (0.05 cm) between the peripheries 74 and 76 and the inner surface 54. Relating the gap dimension to valve housing 52 size, the gap 78 can be from about 0.05% to 0.10% of the diameter of the valve housing 52.

In the embodiment 50 of FIGS. 2-4, the valve housing 52 is generally cylindrical, and the valve element wings 68 and 69 are correspondingly rectangular. However, it will be appreciated that other configurations are possible. For example, the valve housing 52 may be spherical, with the valve element 64 correspondingly round, the two valve element wings 68 and 69 each comprising a semicircle. In the illustrated embodiment, the connection openings 56, 57, 58 and 59 in communication with the main conduits 60, 61, 62 and 63 lie in a plane perpendicular to the valve element axis defined by the shaft 70. However, other arrangements may be employed so long as proper fluid flow communication is maintained; for example, in the FIG. 3 orientation, the various conduits 61, 62 and 63 illustrated may be at different vertical positions.

The particular valve element housing 52 in the embodiment of FIGS. 2-4 is relatively uniform in shape, defining a cylinder, such that the peripheries 74 and 76 of the wings 68 and 69 are always adjacent the inner surface 54 of the valve housing 52, regardless of the rotational position of the butterfly valve element 64. It will however be appreciated that proper fluid flow communication through the valve 50 when the valve element 64 is in one of the valve positions requires only that the peripheries 74 and 76 of the wings 68 and 69 be adjacent the inner surface 54 when the valve element 64 is in one of the valve positions.

As noted hereinabove, leakage from one side of the valve to the other through the gap 78 can seriously degrade the performance of the system 10. Yet, as is also noted above, the gap 78 is required to accommodate manufacturing tolerances and unequal thermal expansion.

In accordance with the invention, the butterfly valve element 64 includes structure cooperating with a portion of the inner surface 54 of the valve housing 52 to define a plenum at least when the valve element 64 is in either of the valve positions. In the embodiment of FIGS. 2-4, this plenum comprises a U-shaped channel element 80 surrounding the entire peripheries 74 and 76 of the valve element 64 wings 68 and 69 as a unit. The channel element 80 has open edges 82 and 84 proximate the inner surface 54 of the valve housing 52, the space between the open edges 82 and 84 and the inner surface 54 defining the gap 78.

For either pressurizing or venting the plenum thus defined, there is a minor conduit in fluid communication with the plenum; in the embodiment of FIGS. 2-4, there are two minor conduits 90 and 92, corresponding to the two alternative positions of the valve element 64. Each of the minor conduits 90 and 92 is connected to a respective port 94 or 96 comprising apertures in the valve body 52. Fluid flow through the minor conduits 90 and 92 is controlled by respective fluid control valves 98 and 100 and respective valve actuators 102 and 104. It will be appreciated that the valve 98 connected to the minor conduit 90 is open when the butterfly valve element 64 is in the position shown in solid lines in FIG. 2 and the valve 100 connected to the other minor conduit 92 is closed. Conversely, the valve 100 connected to the minor conduit 92 is open when the butterfly valve element is in the dash line position 64' in FIG. 2, under which conditions the valve 98 is closed.

During operation, and with reference to the position of the butterfly valve element 64 shown in solid lines in FIG. 2, whether the plenum defined by the channel element 80 and the inner surface 54 is pressurized or vented, leakage between one part of the valve defined by deliberate fluid connection openings between the conduits 60 and 63 and another part of the valve defined by deliberate fluid communication between the conduits 61 and 62 is prevented. Thus, in a regenerative incinerator environment, such as is depicted in FIG. 1, contamination of the treated exhaust gas stream by untreated gas is avoided.

More particularly, pressurization of the plenum to a pressure greater than the pressure in any of the main conduits 60, 61, 62 and 63 causes a small flow of fluid from the plenum through the gap 78 and then into other parts of the valve 50. This prevents fluid from one side of the valve entering the other side of the valve. The pressurizing fluid should be compatible with the purified gas, but need not be the same fluid. Suitable pressurizing fluids include air and purified gas. In one particular case, pressurized treated gas in the conduit 30 on the outlet side of the blower 34 in FIG. 1 may be employed to pressurize the plenum.

Conversely, instead of pressurizing the plenum, the plenum can be forcibly vented to a pressure lower than the pressure in any of the main conduits 60, 61, 62 and 63. Any leakage which passes the gap 78 then flows into the plenum such that there can be no undesired leakage from any main conduit into any other main conduit. An air pump (not shown) is employed to vent gas from the plenum. This vented gas may be admixed with ingoing, untreated fluid entering the FIG. 1 regenerative incinerator system 10 via the conduit 28.

In either event, and assuming the valve 50 is employed in a regenerative incinerator system such as the system 10 of FIG. 1, when the valve element 64 is moving between either of the valve positions 64 (solid lines) and 64' (phantom lines), there is the possibility of a direct connection between the untreated inlet gas conduit 28 and the treated exhaust gas conduit 44. This particularly can occur if the channel element 80 is narrower than the connection openings to the main conduits 44,56; 42,57; 28,58 and 40,59 where they enter the valve housing 50. Assuming, for purposes of example, that the valve element 64 is momentarily vertical in the FIG. 2 orientation as it moves between the two valve positions 64 and 64', and assuming also (contrary to the actual structure of the FIG. 2 valve 50) that the width of the channel element 80 is narrower than the connection openings in communication with the main conduits 28,62 and 44,60, then untreated gas at least momentarily adversely can flow directly from the untreated inlet gas conduit 28 to the treated exhaust gas conduit 44. Similarly assuming, for purposes of example, that the valve element 64 is momentarily horizontal in the FIG. 2 orientation and assuming (contrary to the actual structure of the FIG. 2 valve 50) that the channel element 80 is narrower than the connection openings in communication with the main conduits 40,63 and 42,61, then untreated gas at least momentarily adversely can flow into the lower parts of the conduits 40 and 42, around the periphery of the channel element 80, and from the upper parts of the conduits 40 and 42 to the treated exhaust gas conduit 44.

These adverse flow conditions are minimized in accordance with the invention by providing a U-shaped channel element 80 at least as wide as the main conduit connection openings 56, 57, 58 and 59, in other words, wide enough to completely cover the main conduit connection openings 56, 57, 58 and 59 as the channel element 80 moves past. The two adverse direct flow conditions are thus prevented.

Also, to prevent the rapid flow of untreated gas through the plenum, the direction of shaft 70 rotation when the valve element 64 is moved between the two valve positions 64 and 64' is such that the valve element 64 passes through the horizontal position with reference to the FIG. 2 orientation, rather than through the vertical position. Thus the channel 80 is directly exposed to the main conduits 40,63 and 42,61 connected to the regenerative beds 12 and 14, but not to the untreated inlet main conduit 28,61 and the treated exhaust main conduit 44,60.

Figure 5:
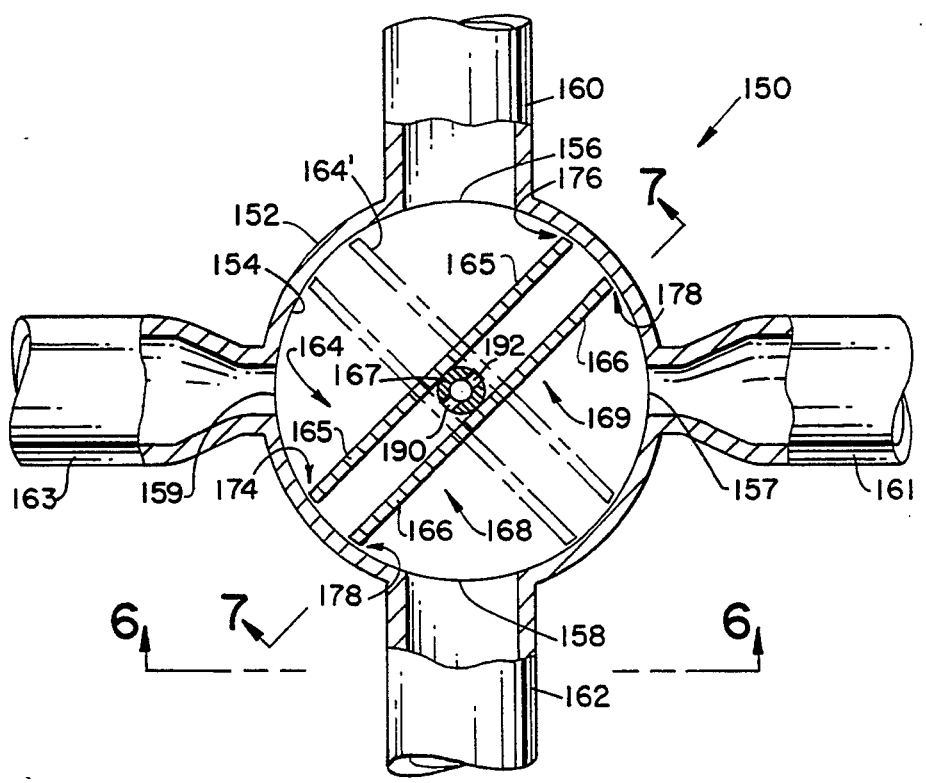
FIG. 5 is a view comparable to that of FIG. 2, showing the interior construction of a four-way valve arrangement with accordance with another embodiment of the invention.

With reference now to FIGS. 5-7, illustrated is another embodiment of the invention in the form of a four-way valve 150 comprising an alternative plenum chamber arrangement. The valve 150 of FIG. 5 similarly comprises a cylindrical housing 152 having an inner surface 154, with connection openings 156, 157, 158 and 159 in fluid communication with four main conduits 160, 161, 162 and 163.

In the embodiment of FIGS. 5-7, a butterfly valve element 164 is rotatable between a valve position depicted in solid lines in FIG. 5 and another valve position 164' depicted in phantom lines. In FIG. 5, it will be seen that the butterfly valve element 164 comprises a pair of spaced parallel plates 165 and 166 fastened to a hollow, tubular shaft 167 extending along the rotation axis of the valve element 164. In the particular embodiment of FIG. 5, the butterfly valve element 164 comprises two wings 168 and 169, and each of the parallel plates 165 and 166 is common to each of the wings 168 and 169.

In this embodiment, the plenum is defined between the spaced parallel plates 165 and 166 and the inner surface 154 of the valve housing 152. The wings 168 and 169 have peripheries 174 and 176, and a gap 178 is defined between the peripheries 174 and 176 and the inner surface 154 in the same manner as the gap 78 is defined between the open edge 82 and 84 and the inner surface 54 in the embodiment of FIGS. 2-3.

In the embodiment of FIGS. 5-7, the interior space comprising the plenum is either pressurized or vented via a hollow interior of the shaft 167, which communicates with the plenum space via radial apertures 190 and 192. Pressurizing or venting has the same leakage-preventing effect as is described hereinabove with reference to FIGS. 2-4. As best seen in FIGS. 6 and 7, the hollow shaft 167 extends through a bearing assembly 194 to a rotary joint 196 which allows connection to a fixed conduit 198. For rotating the shaft 167 and thus the valve element 164, a driven gear 200 is fixed to the shaft 167, and is in engagement with a driving gear 202, in turn driven by an actuator motor 204. Fluid is either introduced under pressure into the plenum chamber or forcibly vented from the plenum chamber through the conduit 198.

To control leakage around the periphery of the valve element 164 while the valve element 164 is being moved between the two valve positions 164 and 164', the conduits 161 and 163 can be narrowed with reference to the orientation of FIG. 5 so as to match the separation between the plates 165 and 166. Thus, as in FIG. 2, the plenum-defining structure is sized such that the defined plenum is wide enough to completely cover at least two of the main conduit connections when the valve element 164 is in a position intermediate the valve positions 164 and 164'. To avoid constricting the flow area of the conduits 161 and 163, the conduits 161 and 163 can transition to an oblong or rectangular opening.

Although not specifically illustrated, it will be appreciated that the hollow shaft 167 with openings 190 and 192 of FIGS. 5–7 can be applied to the embodiment of FIGS. 2–4, and the ports 94 and 96 in the valve body 52 eliminated. In such a modification, suitable conduit connection openings (not shown) are provided between the shaft 167 openings 190 and 192 and the channel element 80.

Referring finally to FIG. 8, depicted is a six-way multiport valve 250, which is a modified form of the valve arrangement 150 of FIGS. 5–9. The view of FIG. 8 is comparable to that of FIG. 5. The multiport valve 250 comprises a housing 252 with an inner surface 254, and has connection openings in fluid communication with six main conduits 256, 258, 260, 262, 264 and 266, spaced 60° apart. A central valve element 268 is rotatable on a central shaft 270, and has three rectangular wings 272, 274 and 276 having respective peripheries 278, 280 and 282 which are adjacent the inner surface 254 of the valve housing 252. The valve element 268 is rotated through an angle of 60° in order to alter the fluid flow pattern through the valve 250 as will be apparent.

The three rectangular wings 272, 274 and 276 more particularly comprise respective pairs of plates 284,286, 288,290 and 292,294, attached to a hollow tube-like element 296 surrounding the central shaft 270. Plenum chambers are thus defined between each of the plate pairs 284,286, 288,290 and 292,294 and the inner surface 254, and these plenum chambers are either pressurized or forcibly vented in the same manner as is described hereinabove.

Although not specifically shown, an arrangement comparable to that of FIG. 6 may be employed. A variety of specific constructions are possible; for example, the solid central shaft 270 might be eliminated, with the hollow tube-like element 296 relied upon to support the structure. Also, it will be appreciated that a variety of support elements are required in an actual structure. By way of example, spaced brackets may be provided between the plates of each pair 284,286, 288,290 and 292,294, as well as between the hollow tube-like element 296 and the central shaft 270.

Disclosed hereinabove are four-way valves and a six-way valve. It will be appreciated however that the invention is applicable to other multiport valve configurations. For example, either the valve 50 of FIGS. 2–4 or the valve 150 of FIGS. 5–7 can be modified to form a three-way valve which may be employed in the system of the above-incorporated Houston U.S. Pat. No. 3,870,474.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A fluid control valve comprising:
    a valve housing having an inner surface and at least three main conduit connection openings;
    a butterfly valve element within said valve housing rotatable on a valve element axis between at least two valve positions, said valve element having at least two wings substantially identical in shape and extending from the valve element axis, the configurations of said valve housing and valve element and the orientation of the valve element axis being such that the peripheries of said wings are adjacent the inner surface of said valve housing when said valve element is in either of the valve positions;
    said main conduit connection openings being located on said valve housing at different angular orientations with reference to the valve element axis such that different pairs of said main conduit connection openings are in deliberate fluid communication when said valve element is in different valve positions;
    said butterfly valve element including structure cooperating with a portion of the inner surface of said valve housing to define a plenum at the peripheries of said wings at least when said valve element is in either of the valve positions, the defined plenum being wide enough to completely cover at least two of said main conduit connection openings when said valve element is in a position intermediate the valve positions; and
    a minor conduit in fluid communication with said plenum.

2. A fluid control valve in accordance with claim 1, wherein:
    said valve housing is cylindrical about a cylindrical axis;
    the valve element axis extends along the cylindrical axis; and
    said valve element wings are generally rectangular.

3. A fluid control valve in accordance with claim 1, wherein said main conduit connection openings lie in a plane perpendicular to the valve element axis.

4. A fluid control valve in accordance with claim 2, wherein said main conduit connection openings lie in a plane perpendicular to the valve element axis.

5. A fluid control valve in accordance with claim 1, which comprises six main conduit connection openings and three valve element wings.

6. A fluid control valve in accordance with claim 5, wherein said valve element structure cooperating to define a plenum comprises a channel element on the peripheries of said wings, the channel element having open edges proximate the inner surface of the valve housing at least when the valve element is in either of the valve positions.

7. A fluid control valve in accordance with claim 6, wherein said channel element is generally "U"-shaped.

8. A fluid control valve in accordance with claim 7, wherein said channel element is annular.

9. A fluid control valve in accordance with claim 1, wherein said valve element structure cooperating to define a plenum comprises a pair of spaced parallel plates fastened to a shaft extending along the valve element axis.

10. A fluid control valve in accordance with claim 1, wherein said minor conduit comprises a tubular shaft extending along the valve element axis.

11. A fluid control valve in accordance with claim 6, wherein said minor conduit comprises a tubular shaft extending along the valve element axis.

12. A fluid control valve in accordance with claim 11, wherein said shaft comprises a hollow tube and said minor conduit comprises said shaft.

13. A fluid control valve in accordance with claim 1, wherein said minor conduit comprises an aperture in said valve body.

14. A fluid control valve in accordance with claim 6, wherein said minor conduit comprises an aperture in said valve body.

15. A fluid control valve in accordance with claim 9, wherein said minor conduit comprises an aperture in said valve body.

16. A fluid control valve in accordance with claim 1, wherein said minor conduit and thus the plenum are pressurized to a pressure higher than the pressure in any of the main conduits to prevent fluid leakage between any of the main conduit connection openings which are not in deliberate fluid communication.

17. A fluid control valve in accordance with claim 16, wherein said minor conduit and thus the plenum are pressurized with an innocuous fluid.

18. A fluid control valve in accordance with claim 16, wherein said minor conduit and thus the plenum are pressurized with a treated fluid which flows through said valve.

19. A fluid control valve in accordance with claim 16, wherein said minor conduit and thus the plenum are pressurized with fluid different from but compatible with fluids which flow through the main conduit connection openings.

20. A fluid control valve in accordance with claim 1, wherein said minor conduit and thus the plenum are vented to a pressure lower than the pressure in any of the main conduit connection openings.

21. A fluid control valve in accordance with claim 20, wherein fluid vented from said minor conduit and thus from said plenum is admixed with untreated fluid entering one of said main conduit connection openings.

22. A fluid control valve comprising:
a valve housing having an inner surface and four main conduit connection openings;
a butterfly valve element within said valve housing rotatable on a valve element axis between at least two valve positions, said valve element having two valve element wings substantially identical in shape and extending from the valve element axis, the configurations of said valve housing and valve element and the orientation of the valve element axis being such that the peripheries of said wings are adjacent the inner surface of said valve housing when said valve element is in either of the valve positions;
said main conduit connection openings being located on said valve housing at different angular orientations with reference to the valve element axis such that different pairs of said main conduit connection openings are in deliberate fluid communication when said valve element is in different valve positions;
said butterfly valve element including structure cooperating with a portion of the inner surface of said valve housing to define a plenum at least when said valve element is in either of the valve positions; and
a minor conduit in fluid communication with said plenum.

23. A fluid control valve comprising:
a valve housing having an inner surface and four main conduit connection openings;
a butterfly valve element within said valve housing rotatable on a valve element axis between two valve positions, said valve element having two wings substantially identical in shape and extending from the valve element axis, the configurations of said valve housing and valve element and the orientation of the valve element axis being such that the peripheries of said wings are adjacent the inner surface of said valve housing when said valve element is in either of the valve positions;
said main conduit connection openings being located on said valve housing at different angular orientations with reference to the valve element axis such that different pairs of said main conduit connection openings are in deliberate fluid communication when said valve element is in different valve positions;
said butterfly valve element including structure cooperating with a portion of the inner surface of said valve housing to define a plenum at the peripheries of said wings at least when said valve element is in either of the valve positions, the defined plenum being wide enough to completely cover at least two of said main conduit connection openings when said valve element is in a position intermediate the valve positions; and
a minor conduit in fluid communication with said plenum.

24. A fluid control valve comprising:
a valve housing having an inner surface and four main conduit connection openings;
a butterfly valve element within said valve housing rotatable on a valve element axis between two valve positions, said valve element having two wings substantially identical in shape and extending from the valve element axis, the configurations of said valve housing and valve element and the orientation of the valve element axis being such that the peripheries of said wings are adjacent the inner surface of said valve housing when said valve element is in either of the valve positions;
said main conduit connection openings being located on said valve housing at different angular orientations with reference to the valve element axis such that different pairs of said main conduit connection openings are in deliberate fluid communication when said valve element is in different valve positions;
said butterfly valve element including a channel element on the peripheries of said wings, the channel element having open edges proximate the inner surface of the valve housing at least when the valve element is in either of the valve positions such that the channel element cooperates with a portion of the inner surface of said valve housing to define a plenum; and
a minor conduit in fluid communication with said plenum.

25. A fluid control valve in accordance with claim 23, wherein said valve element structure cooperating to define a plenum comprises a pair of spaced parallel plates fastened to a shaft extending along the valve element axis.

26. A fluid control valve in accordance with claim 23, wherein said minor conduit comprises a tubular shaft extending along the valve element axis.

27. A fluid control valve in accordance with claim 25, wherein said shaft comprises a hollow tube and said minor conduit comprises said shaft.

28. A fluid control valve in accordance with claim 23, wherein said minor conduit and thus the plenum are pressurized to a pressure higher than the pressure in any of the main conduits to prevent fluid leakage between any of the main conduit connection openings which are not in deliberate fluid communication.

29. A fluid control valve in accordance with claim 23, wherein said minor conduit and thus the plenum are vented to a pressure lower than the pressure in any of the main conduit connection openings.

30. A fluid control valve comprising:
a generally cylindrical valve body with a closure plate at each end of the valve body;
at least three radially spaced conduit ports connecting to said valve body;
a rotor rotatably mounted within said valve body for selectively directing material from one port to either adjacent port;
said rotor including two spaced parallel plates mounted on a rotor shaft with said plates extending radially and axially to within proximity of the inside of said valve body, a space being defined between said parallel plates;
said parallel plates being spaced at least as far apart as the width of at least two of said ports;
a minor conduit connection to the space between said parallel plates; and
means to rotate said rotor between a first position and a second position so that at least one of said ports is in fluid communication with an adjacent port in the first position and with other adjacent port in the second position.

31. A fluid control valve in accordance with claim 30, wherein said minor conduit connection pressurizes the space between said parallel plates.

32. A fluid control valve in accordance with claim 30, wherein said minor conduit connection evacuates the space between said parallel plates.

33. A fluid control valve in accordance with claim 30, wherein said minor conduit comprises a hollow shaft in fluid communication with the space between said plates.

34. A fluid control valve comprising:
a generally cylindrical valve body with a closure plate at each end of the valve body;
at least three radially spaced conduit ports connecting to said valve body;
a rotor rotatably mounted within said valve body for selectively directing material from one port to either adjacent port;
said rotor including a shaft, a plate mounted on said shaft and extending radially outward, and U-shaped channel members mounted on the outside edges of said plate with the edges of the U-shaped channel members in proximity with the inside of the valve housing, a space being defined by the U-shaped channel members and the inside of the valve body;
the edges of said U-shaped channel members being at least as far apart as the width of at least two of said ports;
at least one minor conduit connection to the space defined by the U-shaped channel members and the inside of the valve body; and
means to rotate said rotor between a first position and a second position so that at least one of said ports is in fluid communication with an adjacent port in the first position and with other adjacent port in the second position.

35. A fluid control valve in accordance with claim 34, wherein at least three U-shaped channel members are mounted on said plate, and wherein said at least one minor conduit connection is positioned on one of said closure plates in fluid communication with the space defined by the U-shaped channel members and the inside of the valve body.

* * * * *